Nov. 14, 1961   Y. H. TANNER   3,008,643
TRACTION MAT
Filed June 19, 1958
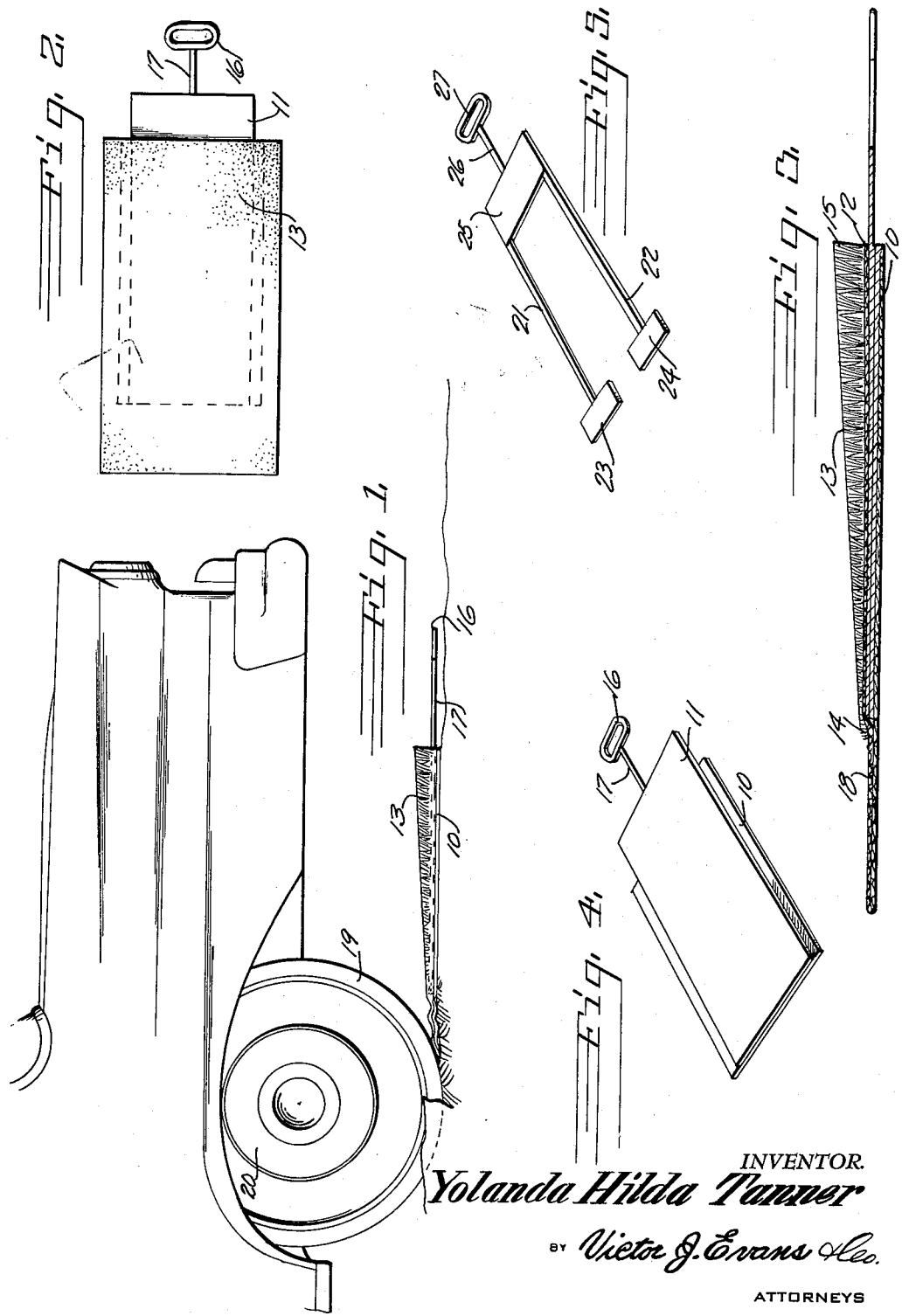
INVENTOR.
Yolanda Hilda Tanner
BY Victor J. Evans & Co.
ATTORNEYS

United States Patent Office 3,008,643
Patented Nov. 14, 1961

3,008,643
TRACTION MAT
Yolanda Hilda Tanner, Washington, D.C.
(5404 Tuscarawas, Glen Echo Heights, Md.)
Filed June 19, 1958, Ser. No. 743,176
2 Claims. (Cl. 238—14)

This invention relates to non-skid devices used in combination with motor vehicles, and in particular a wedge-shaped mat in which the thickness of fibers of the mat tapers from a thin edge at one end to a relatively high edge at the opposite end and in which a handle extends from the thick end and is connected to a reinforcing element in the mat.

The purpose of this invention is to provide a device which facilitates operation of a motor vehicle in mud, snow, ice, and the like in which the device may be stored in the trunk of a vehicle and may be removed and positioned for use by the average layman.

Various types of non-skid devices have been provided for use in combination with motor vehicles, however, such devices are either attached to the vehicles or are relatively heavy and cumbersome making it difficult for the average layman, and particularly women, to position the devices under wheels of a vehicle. With this though in mind this invention contemplates a mat of comparatively lightweight having a reinforcing element with a handle extended therefrom incorporated therein and in which the device may readily be positioned to provide traction for a wheel or wheels of a motor vehicle.

The object of this invention is, therefore, to provide a fabric mat having a tapering upper surface in which the mat is adapted to be positioned below wheels of a motor vehicle.

Another object of the invention is to provide a traction mat that has a handle extended therefrom whereby the mat may be placed in position with one hand.

A further object of the invention is to provide a traction mat for use under tires of wheels of motor vehicles in which the mat is of a simple and economical construction.

With these and other objects and advantages in view the invention embodies a substantially rectangular-shaped sheet of material, a reinforcing plate positioned on the sheet of material and having a handle extended therefrom and fibers extended from the mat and sheet of material and tapering from the relatively thin edge at one end of the sheet of material to a thick edge at the opposite end.

Other features and advantages of the invention will appear from the following description taken in connection with the drawing, wherein:

FIGURE 1 is a side elevational view showing the rear portion of a motor vehicle with the thin edge of the mat of this invention inserted under the rear wheel on the near side of the vehicle.

FIGURE 2 is a plan view of the mat showing the device with the reinforcing element partly withdrawn from the large end of the mat.

FIGURE 3 is a longitudinal section through the mat with the parts shown on an enlarged scale illustrating the relative positions of the layers of material, fibers, and reinforcing element.

FIGURE 4 is a perspective view showing the reinforcing element on a lower sheet of material with the upper sheet of material omitted.

FIGURE 5 is a perspective illustrating a modification wherein the reinforcing element is replaced with spaced parallel wires formed to extend through the intermediate portion of the mat.

Referring now to the drawing wherein like reference characters denote corresponding parts the improved traction mat of this invention includes a back or base layer of material 10, an intermediate plate 11 of metal or other stiff material, an upper layer of material 12, fibers 13 which taper from a relatively thin edge 14 at one end of the mat to a point 15 at the opposite end, and a loop 16 carried by a stem 17 providing a handle extended from one end of the mat.

The backing or base member 10 is formed of heavy fabric, such as burlap, canvas, or the like and, as shown in FIGURES 1 and 3 the base member is provided with a corrugated section 18 which facilitates gripping action between the surface of a tire 19 of a wheel 20 and the fibers of the mat. The upper layer 12 is positioned over the reinforcing element 11 and the parts are secured together by rubber or other plastic or by a suitable cement.

In the design illustrated in FIGURE 5 a pair of parallel rods or wires 21 and 22 are positioned in the mat and inner ends of the wires are provided with bars 23 and 24 to insure the rods or wires remaining in the mat. Opposite ends of the wires are connected with a plate 25 from which a stem 26 of a loop 27 extends.

The fabric backing 10 and inner lining 12 are formed of a suitable flexible material and the fibers 13 extend from the backing or intermediate web 12 being woven in the material or secured thereto by suitable means.

In use the mat is carried in the trunk of a motor vehicle and when traveling in snow or upon an icy pavement or when one wheel is positioned in mud the mat is removed and inserted under the rear wheel, as shown in FIGURE 1, in which the device is positioned to the rear of the wheel and with the thin or corrugated end inserted under the tire the vehicle is operated in reverse with the tire rolling upwardly on the mat.

The traction mat, therefore, includes base and intermediate layers of fabric, such as burlap, canvas, and the like with a reinforcing plate 11 of aluminum or other metal positioned between the layers of fabric and with a loop providing a handle extended from one end and integrally secured to the reinforcing layer or plate. The mat includes fibers or the like extended from the backing and intermediate layer and tapering from a comparatively thin edge at one end to a relatively thick edge at the opposite end. The thin edge is provided with transversely disposed corrugations 18 and with this end of the mat inserted under a tire of a wheel of a motor vehicle, as illustrated in FIGURE 1, the wheel will climb upwardly on the incline whereby traction is provided making it possible to move the vehicle from mud or in ice and snow.

It will be understood that modifications, within the scope of the appended claims, may be made in the design and arrangement of the parts without departing from the spirit of the invention.

What is claimed is:
1. In a traction mat, the combination which comprises a fabric backing layer, a fabric intermediate layer positioned on the backing layer, a U-shaped stiffening element comprising a pair of parallel rods, a plate connecting one end of each rod to retain said rods in fixed relation to each other, a short bar on the opposite end of each rod extending transversely of each rod in spaced parallel relation to each other and having a handle extended outwardly from the medial portion of said plate, said element being positioned between the layers, and fibers extended upwardly from the mat, the extended ends of the fibers tapering from a thin edge at one end of the backing to a point spaced from the backing at the opposite end providing a mat wedge-shaped in longitudinal section.

2. In a traction mat, the combination which comprises an elongated fabric layer having transversely disposed corrugations spaced inwardly from one end, a U-shaped stiffening element comprising a pair of parallel rods, a plate connecting one end of each rod to retain said rods in fixed relation to each other, a short bar on the opposite end of each rod extending transversely of each rod in spaced parallel relation to each other, said stiffening element being positioned on said layer of material, an intermediate layer of fabric positioned over the stiffening element and secured to the backing layer, fibers extended from the intermediate and backing layers, upper ends of the fibers tapering from a thin edge at one end of the backing layer to a point spaced from the backing layer at the opposite end of the mat, and a stem having a loop on the extended end extended from the medial portion of the plate of the stiffening element between the base and intermediate layers of the fabric.

References Cited in the file of this patent

UNITED STATES PATENTS

| | | |
|---|---|---|
| 366,645 | Chattaway | July 19, 1887 |
| 1,004,861 | Ek | Oct. 3, 1911 |
| 1,139,899 | Otis | May 18, 1915 |
| 1,142,727 | Pottsgrove | June 8, 1915 |
| 1,375,666 | Bauer | Apr. 26, 1921 |
| 1,380,574 | Mason | June 7, 1921 |
| 1,863,316 | Webster | June 14, 1932 |
| 2,422,006 | Friedman | Dec. 11, 1947 |
| 2,486,911 | Becker | Nov. 1, 1949 |
| 2,577,890 | Hardy | Dec. 11, 1951 |